(12) United States Patent
Chiu et al.

(10) Patent No.: US 9,630,285 B2
(45) Date of Patent: Apr. 25, 2017

(54) SERVO-DRIVEN TOOL UNCLAMPING SYSTEM FOR A MACHINE TOOL

(71) Applicant: INNOSERV FA INC., Tortola (VG)

(72) Inventors: Yu-Chuan Chiu, Taichung (TW); Chih-Lung Lai, Taichung (TW)

(73) Assignee: INNOSERV FA INC. (VG)

( * ) Notice: Subject to any disclaimer, the term of this patent is extended or adjusted under 35 U.S.C. 154(b) by 352 days.

(21) Appl. No.: 14/309,616

(22) Filed: Jun. 19, 2014

(65) Prior Publication Data

US 2015/0367467 A1    Dec. 24, 2015

(51) Int. Cl.
B23Q 3/157    (2006.01)
B23Q 3/155    (2006.01)

(52) U.S. Cl.
CPC ....... B23Q 3/15713 (2013.01); B23Q 3/1554 (2013.01); Y10T 409/309464 (2015.01); Y10T 483/1748 (2015.01); Y10T 483/1755 (2015.01)

(58) Field of Classification Search
CPC .............. B23Q 3/1554; B23Q 3/15573; B23Q 3/15713; Y10T 408/95; Y10T 408/957; Y10T 409/309408; Y10T 483/1748; Y10T 483/1752; Y10T 483/1755; Y10T 483/1757; Y10T 483/176
USPC .......... 483/36, 38, 39, 40, 41; 409/232, 233; 408/239 A, 239 R
See application file for complete search history.

(56) References Cited

U.S. PATENT DOCUMENTS

| | | | | |
|---|---|---|---|---|
| 5,372,568 A * | 12/1994 | Matsuoka | ............. | B23B 31/263 409/233 |
| 6,179,533 B1 * | 1/2001 | Sun | ........ | B23B 31/265 279/50 |
| 6,846,276 B2 * | 1/2005 | Yasumatsuya | ....... | G05B 19/182 483/1 |
| 2007/0286695 A1 * | 12/2007 | Boisvert | ............... | B23B 31/207 409/131 |
| 2007/0290459 A1 * | 12/2007 | Kitaura | ................. | B23B 31/261 279/155 |
| 2008/0080943 A1 * | 4/2008 | Bernhard | .............. | B23B 31/261 409/233 |
| 2011/0177925 A1 * | 7/2011 | Mayr | ................... | B23Q 1/4876 483/44 |
| 2012/0087756 A1 * | 4/2012 | Kanematsu | ........... | B23B 31/263 409/80 |

FOREIGN PATENT DOCUMENTS

JP    06155215 A    *    6/1994

* cited by examiner

*Primary Examiner* — Sunil K Singh
*Assistant Examiner* — Michael Vitale

(57) ABSTRACT

A servo-driven tool unclamping system for a machine tool contains: a tool changing unit, a tool unclamp unit, and a servo control unit. The tool changing unit includes a cam box, a first servo motor for driving the cam box, a driving shaft driven by the cam box, and a tool change arm driven by the driving shaft. The tool unclamp unit includes a spindle, a transmission assembly, and a second servo motor. The servo control unit includes a main controller, a first servo drive and a second servo drive both electrically connected with and controlled by the main controller. The first servo drive and the second servo drive are also electrically coupled with the first servo motor and the second servo motor and numerically control the tool changing unit and the tool unclamp unit, hence the tool change arm operates, and the spindle clamps and unclamps each tool.

6 Claims, 10 Drawing Sheets

SERVO-DRIVEN TOOL UNCLAMPING SYSTEM FOR A MACHINE TOOL

BACKGROUND OF THE INVENTION

1. Technical Field

The present invention relates to a tool unclamping system for a machine tool, and more particularly to a servo-driven tool unclamping system for the machine tool which numerically controls a tool change arm to operate and controls a spindle to clamp and unclamp tools in different operating tracks.

2. Description of Related Art

A conventional machine tool contains an ATC system with a cam box, the cam box has two roller gear cams for driving a driven roller set to actuate a rotation of a tool change arm, and the two roller gear cams drive a connecting rod assembly to move the tool change arm upwardly and downwardly, wherein when the tool change arm rotates below a spindle, a tool on the spindle is unclamped or clamped after a sensor detects a position of the tool change arm. After confirming the tool change arm is positioned, the sensor transmits a signal to start a hydraulic cylinder or a pneumatic cylinder on the spindle so that a drive post of a tool unlock mechanism is driven by the hydraulic cylinder or the pneumatic cylinder to actuate the spindle, such that the spindle unclamps the tool and the tool change arm changes the tool.

However, a tool unclamping and clamping of the spindle and a vertical movement of the tool change arm cannot be realized simultaneously, because when the sensor confirms the signal, the tool changing operation pauses several times to prolong tool change time and working time. In addition, the tool change arm and the tool unlock mechanism of the spindle are driven by a mechanical structure or a hydraulic structure, so before changing the tool, a worker has to adjust the machine tool manually, thus causing operational inconvenience. Also, a connecting structure between the tool change arm and the tool unlock mechanism of the spindle is complicated and has a large size, thus occupying configuration space and increasing maintenance difficult.

Furthermore, when a cylinder of the tool unlock mechanism is in a tool unclamp stroke, a distance between the drive post and a pull stud is adjusted by using a washer, thereby complicating the tool unlock mechanism.

The present invention has arisen to mitigate and/or obviate the afore-described disadvantages.

SUMMARY OF THE INVENTION

The primary object of the present invention is to provide a servo-driven tool unclamping system for a machine tool which numerically controls a tool change arm to operate and controls a spindle to clamp and unclamp tools in different operating tracks, such that a tool changing unit and a tool unclamp unit operate synchronously to execute tool unclamping operation of the machine tool quickly and to enhance production efficiency.

Another object of the present invention is to provide a servo-driven tool unclamping system for a machine tool in which a servo motor directly drives a transmission assembly so that a biasing member of the transmission assembly actuates a pushing stem, and then the pushing stem moves linearly between a pulling position and a unclamping position, hence the tool unclamp unit is simplified, has a small size, and operates precisely and quickly.

To obtain the above objectives, a servo-driven tool unclamping system for a machine tool provided by the present invention contains: a tool changing unit, a tool unclamp unit, and a servo control unit.

The tool changing unit includes a cam box, a first servo motor for driving the cam box, a driving shaft driven by the cam box, and a tool change arm driven by the driving shaft to rotate. The first servo motor drives the cam box and the driving shaft sequentially to control the tool change arm to change two tools.

The tool unclamp unit includes a spindle, a transmission assembly, and a second servo motor. The second servo motor drives the transmission assembly to actuate the spindle to unclamp and clamp each tool.

The servo control unit includes a main controller, a first servo drive and a second servo drive both electrically connected with and controlled by the main controller, wherein the first servo drive and the second servo drive are also electrically coupled with the first servo motor and the second servo motor and numerically control the tool changing unit and the tool unclamp unit by using a program, such that the tool change arm operates, and the spindle clamps and unclamps each tool in different operating tracks.

DETAILED DESCRIPTION OF THE PREFERRED EMBODIMENTS

Figure 1:
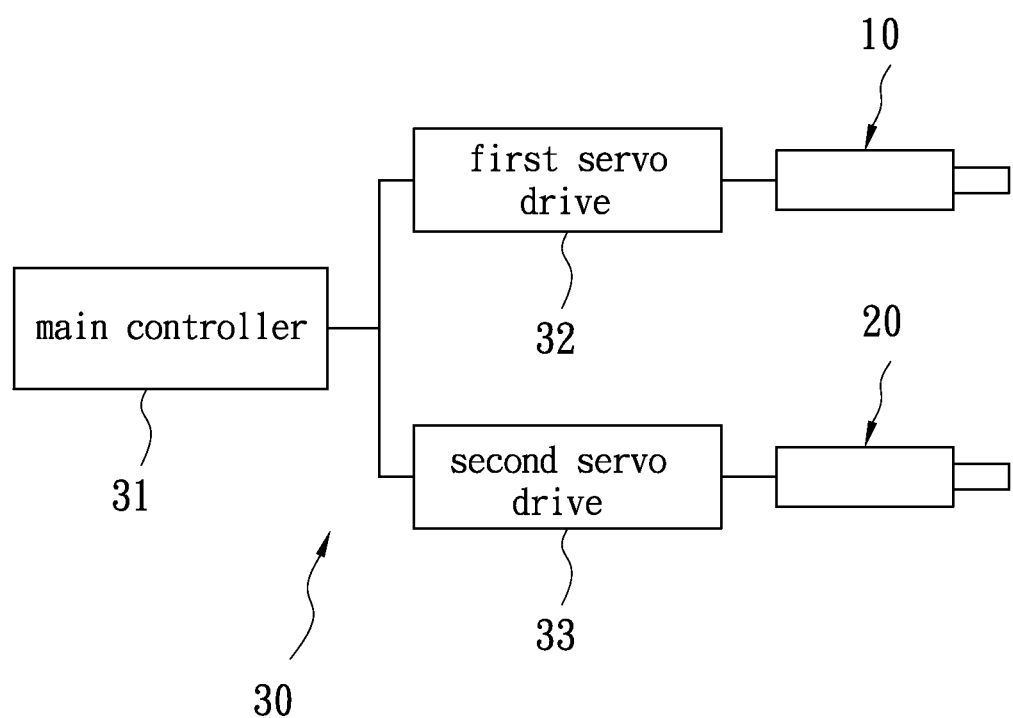
FIG. 1 is a block diagram of a servo-driven tool unclamping system for a machine tool according to a preferred embodiment of the present invention.
Figure 2:
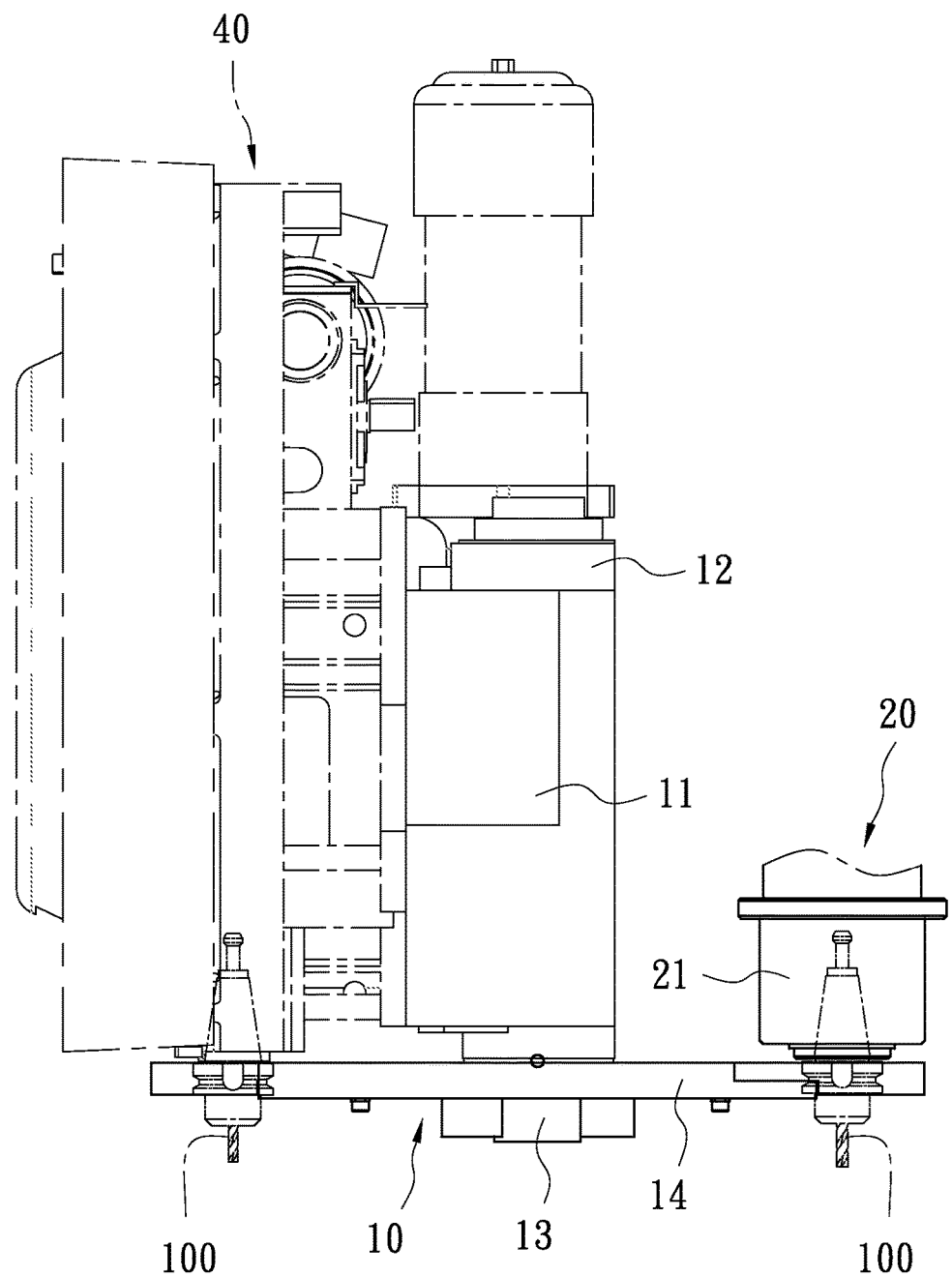
FIG. 2 is a side plan view showing the assembly of the servo-driven tool unclamping system for the machine tool according to the preferred embodiment of the present invention.

With reference to FIGS. 1 and 2, a servo-driven tool unclamping system for a machine tool according to a preferred embodiment of the present invention is employed to operate two tools 100 and comprises: a tool changing unit 10, a tool unclamp unit 20, and a servo control unit 30.

The tool changing unit 10 includes a cam box 11, a first servo motor 12 for driving the cam box 11, a driving shaft 13 driven by the cam box 11, and a tool change arm 14 driven by the driving shaft 13 to rotate. The first servo motor 12 drives the cam box 11 and the driving shaft 13 sequentially to control the tool change arm 14 to change the two tools 100. In use, the tool changing unit 10 is mounted on one side of a tool magazine unit 40 (as shown in FIG. 2).

Figure 3:
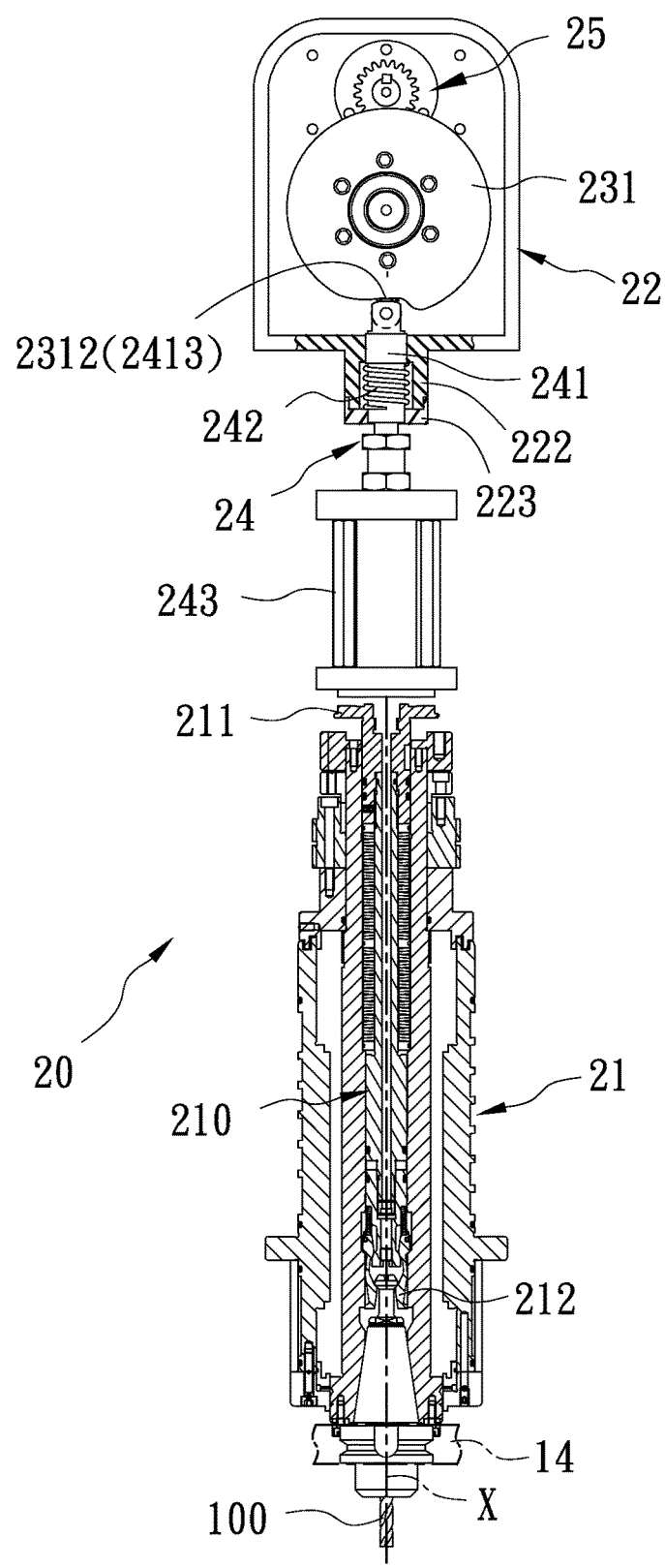
FIG. 3 is a cross sectional view showing a transmission assembly of a tool unclamp unit and a driving assembly being connected with a tool unlock mechanism of a spindle, wherein the tool unclamp unit is located at a starting position.

Referring further to FIG. 3, the tool unclamp unit 20 includes a spindle 21, a casing 22, a transmission assembly 23, a driving assembly 24, and a second servo motor 25, wherein the second servo motor 25 drives the transmission assembly 23 to actuate the spindle 21 to unclamp and clamp each tool 100.

The servo control unit 30 includes a main controller 31, a first servo drive 32 and a second servo drive 33 both electrically connected with and controlled by the main controller 31, wherein the first servo drive 32 and the second servo drive 33 are also electrically coupled with the first servo motor 12 and the second servo motor 25 and numerically control the tool changing unit 10 and the tool unclamp unit 20 by using a program, such that the tool change arm 14 of the tool changing unit 10 operates, and the spindle 21 of the tool unclamp unit 20 clamps and unclamps each tool 100 in different operating tracks.

Figure 4:
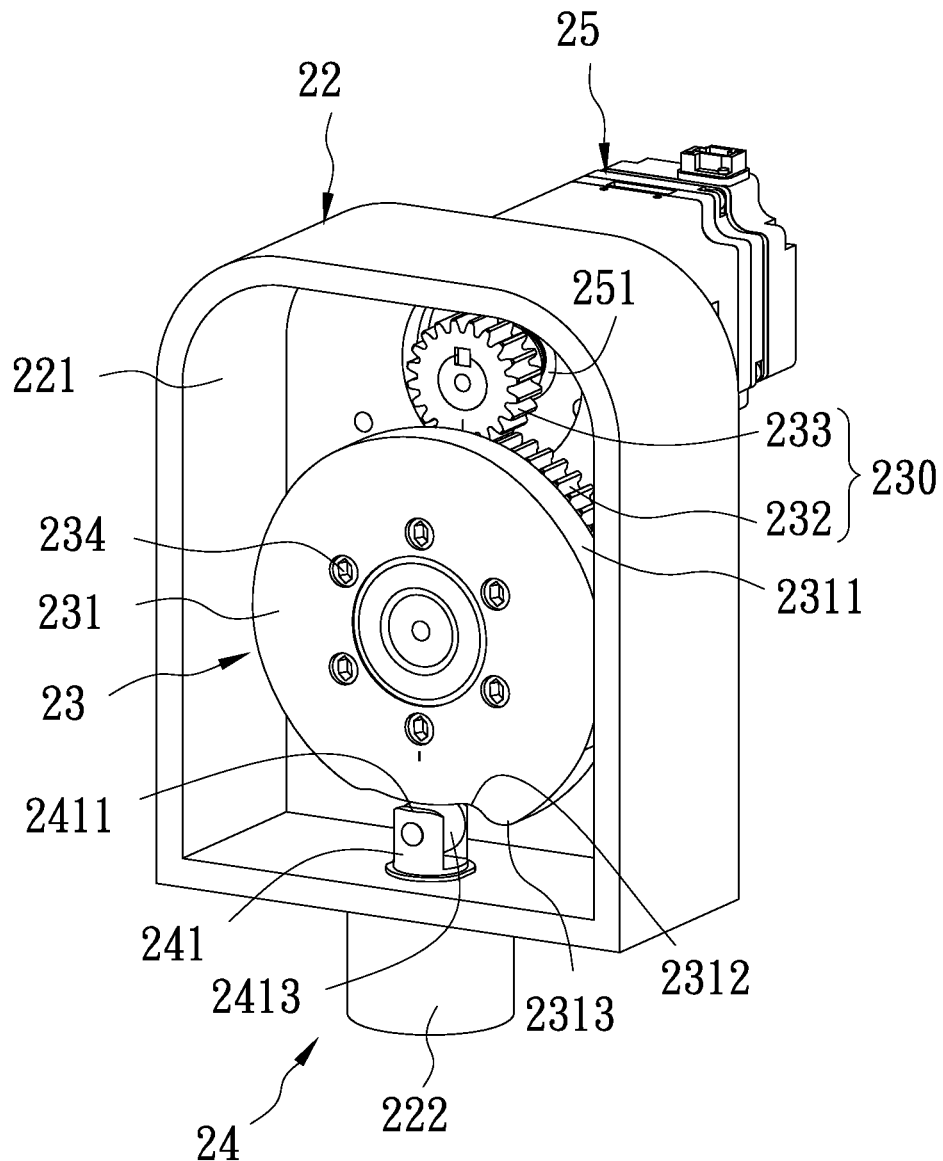
FIG. 4 is a perspective view showing the assembly of the servo-driven tool unclamping system for the machine tool according to the preferred embodiment of the present invention.
Figure 5:
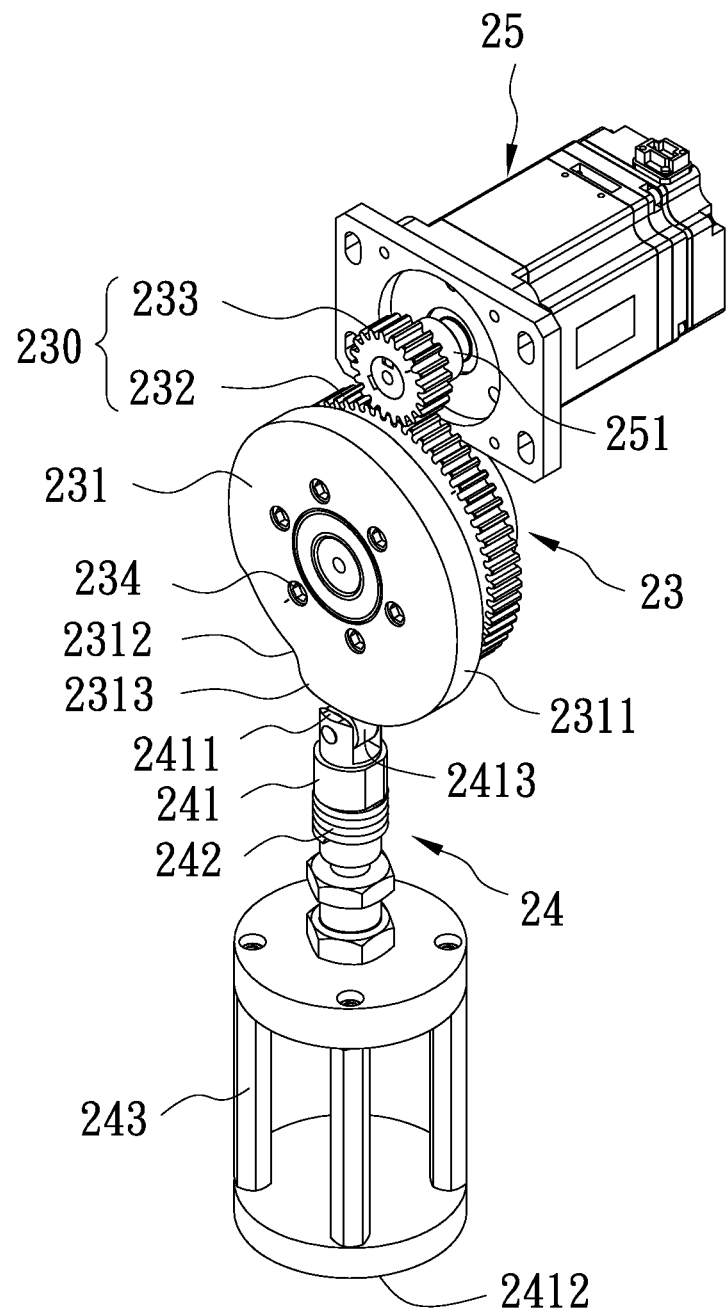
FIG. 5 is another perspective view showing the assembly of the servo-driven tool unclamping system for the machine tool according to the preferred embodiment of the present invention.

As shown in FIGS. 3 to 4, the spindle 21 of the tool unclamp unit 20 has a tool unlock mechanism 210, a pull stud 211, and a clamping jaw 212. Since the tool unlock mechanism 210 is a well-known art, further remarks are omitted.

The first servo motor 25 has a drive shaft 251.

The casing 22 has an accommodating space 221. In this embodiment, the casing 22 has a protective cover (not shown) for covering the accommodating space 221.

The transmission assembly 23 is accommodated in the accommodating space 221. The transmission assembly 23 includes a gear set 230 coupling with the drive shaft 251 of the second servo motor 25 and a biasing member 231 synchronously operating with the gear set 230, wherein the biasing member 231 has a noncircular face 2311 defined around a peripheral side thereof. The gear set 230 has a first gear 232 rotatably disposed in the casing 22 and a second gear 233 meshing with the first gear 232 and pivoted on the drive shaft 251 of the second servo motor 25 to form a gear deceleration system, wherein the biasing member 231 is coaxial with the first gear 232. In this embodiment, the biasing member 231 is a plate cam and is in connection with the first gear 232 by ways of plural screwing elements 234.

The biasing member 231 has a concaved section 2312 arranged on the noncircular face 2311 and a convex section 2313 proximate to one side of the concaved section 2312.

The driving assembly 24 is secured on an upper end of the spindle 21 and includes a pushing stem 241 sliding along an X axis of the spindle 21, a resilient element 242 fitted on the pushing stem 241, and an abutting holder 243 mounted on a bottom end of the pushing stem 241. The resilient element 242 is any one of a compression spring, a Belleville washer, and an elastic rubber (In this embodiment, the resilient element 242 is the compression spring). The pushing stem 241 has a top edge 2411 corresponding to the noncircular face 2311 of the biasing member 231, a bottom edge 2412 corresponding to the pull stud 211 of the spindle 21, and a rolling element 2413 rotatably fixed on the top edge 2411, wherein the resilient element 242 is biased against the biasing member 231. The pushing stem 241 linearly contacts with the biasing member 231 by means of the rolling element 2413 to reduce friction between the biasing member 231 and the pushing stem 241. The driving assembly 24 is secured in a receiving tube 222 on a bottom end of the casing 22, wherein the receiving tube 222 has a lid 223 disposed on a bottom end thereof to avoid the resilient element 242 falling out of the receiving tube 222.

Figure 7:
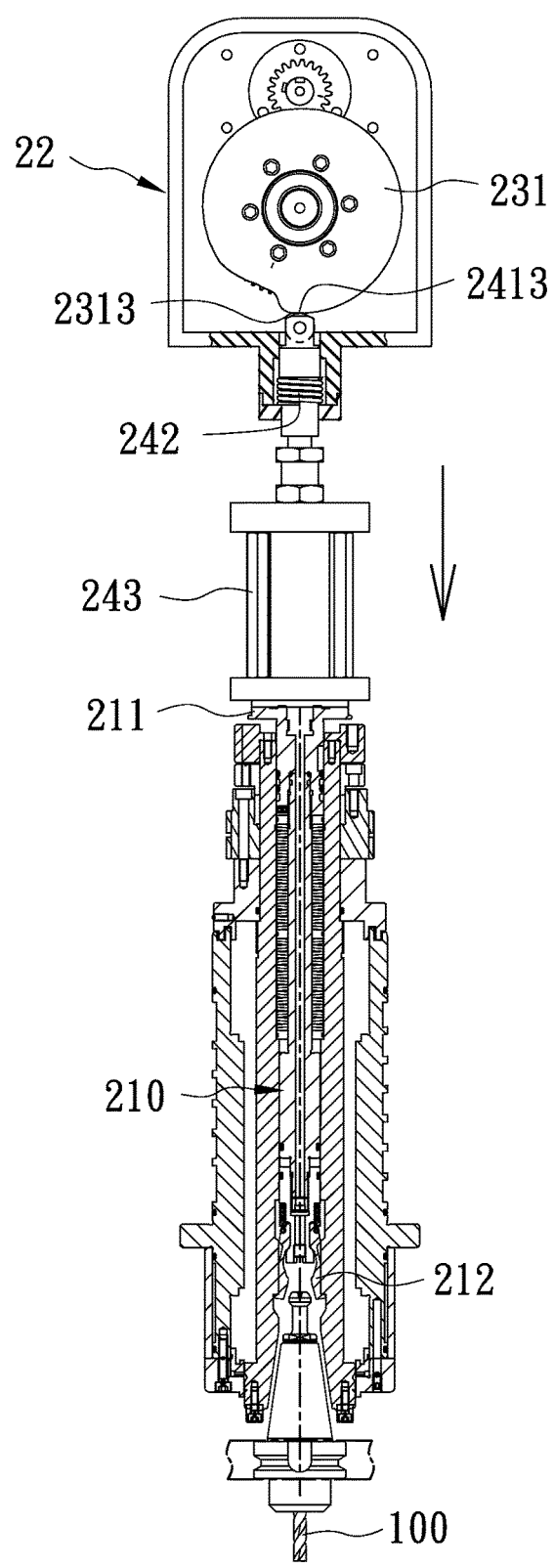
FIG. 7 is a cross sectional view showing the tool unclamp unit finishes tool unclamping operation.

When the second servo motor 25 drives the transmission assembly 23, the biasing member 231 is synchronously driven by the second servo motor 25 to actuate the pushing stem 241, and then the pushing stem 241 moves reciprocately to drive the pull stud 211 to move linearly between a pulling position (as shown in FIG. 3) and a unclamping position (as illustrated in FIG. 7), hence the tool unclamp unit 20 clamps and unclamps the two tools 100. By explaining a rotating position of the biasing member 231 as follows, a corresponding relationship between the tool unclamp unit 20 and the tool unlock mechanism 210 is well understood.

With reference to FIG. 3, the second servo motor 25 does not operate in a normal state, and a predetermined distance is maintained between the driving assembly 24 and the tool unlock mechanism 210, i.e., the abutting holder 243 does not contact the pull stud 211, a tool 100 on the spindle 21 is clamped by the clamping jaw 212, and the concaved section 2312 of the biasing member 231 abuts against the rolling element 2413 of the pushing stem 241, the resilient element 242 expands outwardly.

Figure 6:
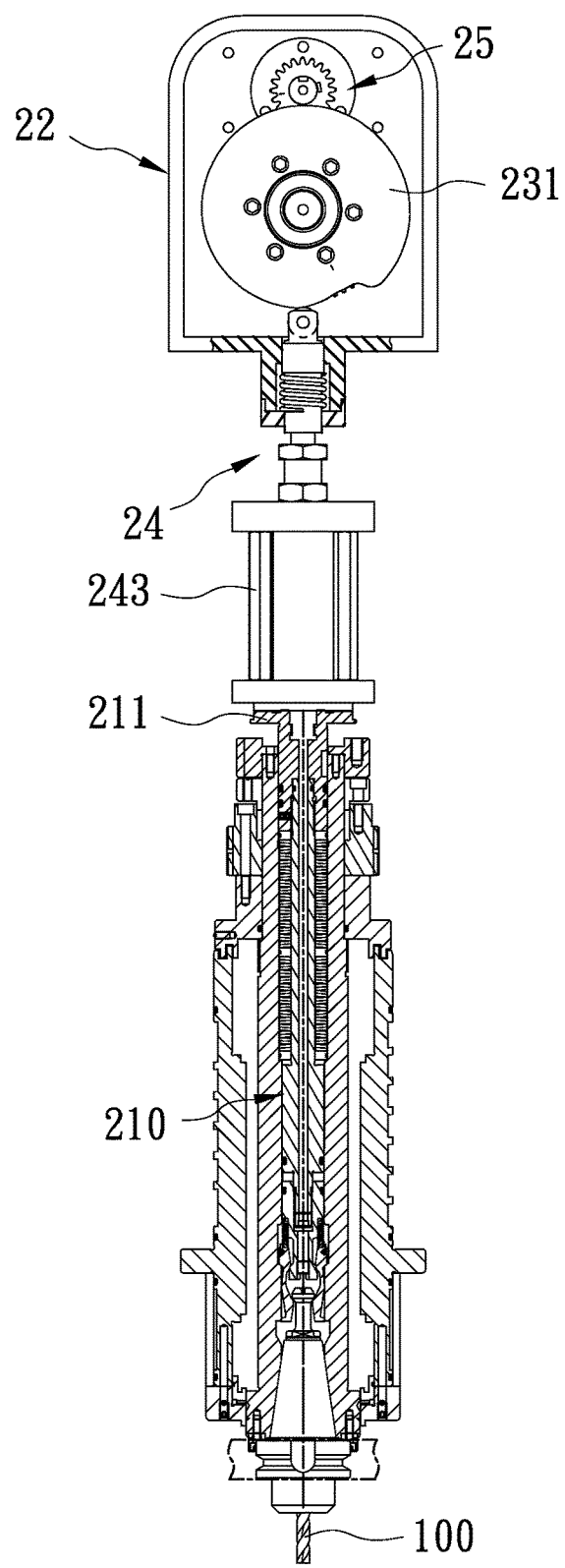
FIG. 6 is a cross sectional view showing a corresponding relationship between a biasing member and a driving assembly, when the tool unclamp unit unclamps a tool.

Referring to FIG. 6, when the second servo drive 33 of FIG. 1 drives the tool unclamp unit 20 to operate, the second servo motor 25 drives the transmission assembly 23, and then the biasing member 231 of the transmission assembly 23 rotates counterclockwise, the abutting holder 243 of the driving assembly 24 is merely biased against a top end of the pull stud 211, and the tool 100 on the spindle 21 is still clamped by the clamping jaw 212 of the tool unlock mechanism 210.

As illustrated in FIG. 7, when a rotating angle of the biasing member 231 increases gradually, the biasing member 231 of the transmission assembly 23 rotates counterclockwise, and the convex section 2313 of the biasing member 231 contacts the rolling element 2413 so that the abutting holder 243 presses the tool unlock mechanism 210 downwardly, and the pull stud 211 drives the clamping jaw 212 to unclamp the tool 100, in the meantime, the resilient element 242 is pressed to be at a shortest length.

Figure 8:
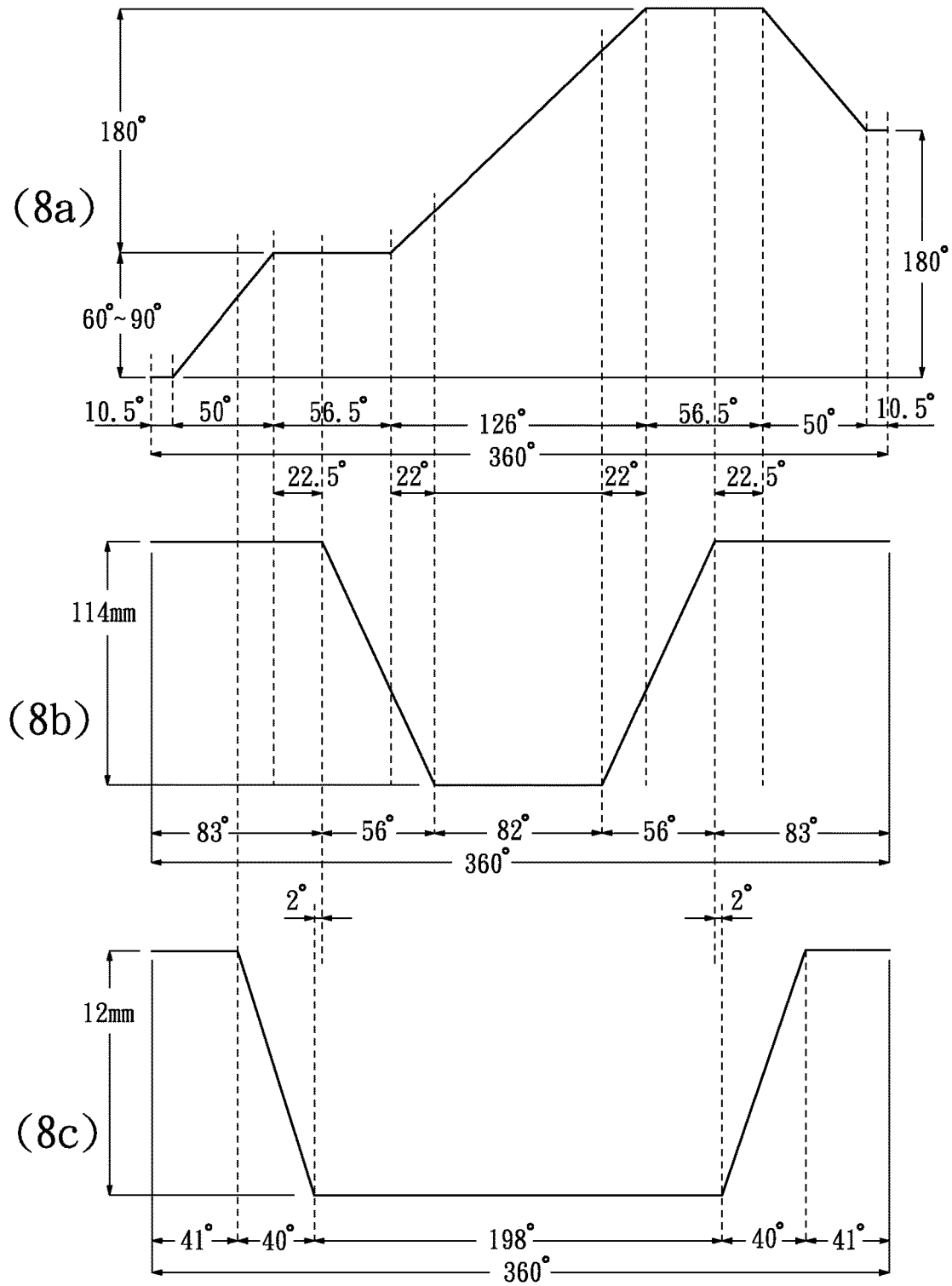
FIG. 8 is a sequence diagram showing after the spindle unclamps the tool, a tool change arm clamps the tool, wherein part (8a) is a curve diagram illustrating a rotating operation of the tool change arm, part (8b) is a curve diagram illustrating a vertical moving operation of a driving shaft of the tool change arm, and part (8c) is a curve diagram illustrating tool unclamping and clamping operations of the tool unclamp unit.

As shown in FIG. 8, an angle at a horizontal coordinate represents an angle of a rotating cycle time of the motor, and a vertical coordinate denotes a rotating angle 8*a*, a vertical moving distance 8*b*, and an unclamping distance 8*c* of the tool change arm 14.

Figure 9:
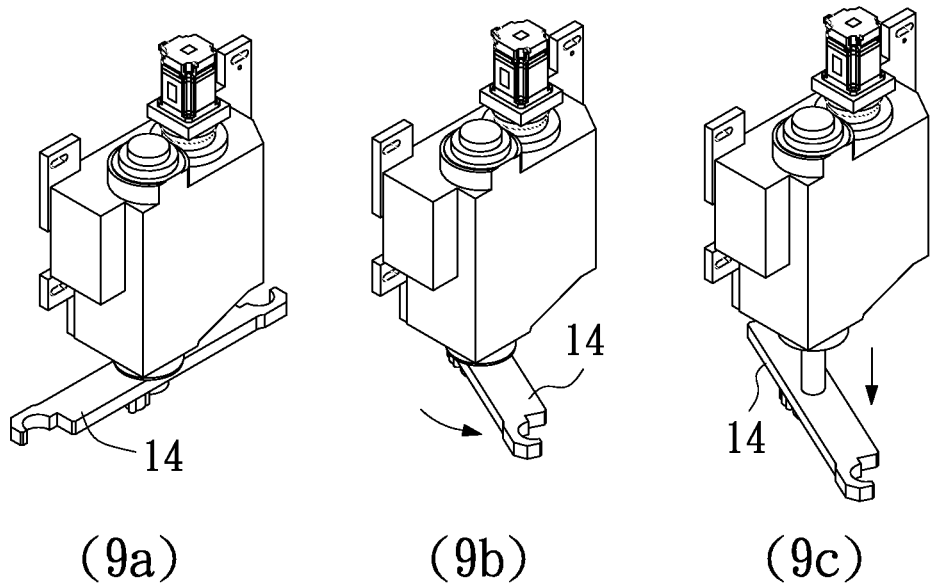
FIG. 9 is a perspective view showing the operation of the tool change arm, wherein part (9a) illustrates the tool change arm is in an original state, part (9b) illustrates the tool change arm rotates 65 degrees counterclockwise, part (9c) illustrates the tool change arm moves 114 mm downwardly, part (9d) illustrates the tool change arm rotates 180 degrees counterclockwise, part (9e) illustrates the tool change arm moves 114 mm upwardly, and part (9*f*) illustrates the tool change arm rotates 65 degrees clockwise.
Figure 9:
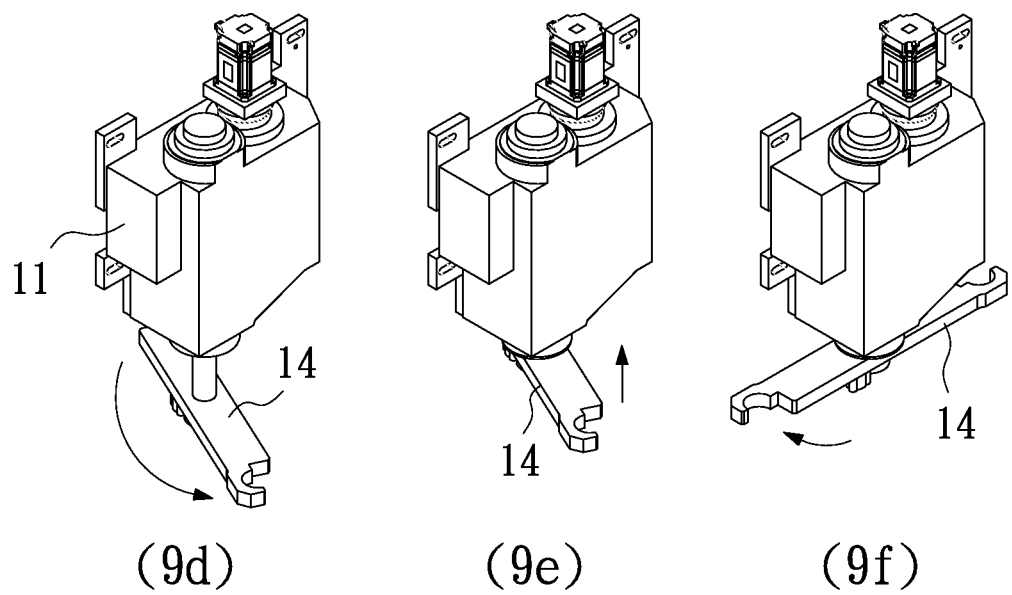

A synchronous tool unclamping of the servo-driven tool unclamping system in a first operation mode means the tool change arm 14 re-clamps the tool, after the spindle 21 releases the tool. For example, as shown in FIGS. 1, 2, 8 and 9, the main controller 31 of the servo control unit 30 controls the first servo drive 32 to start the first servo motor 12, and then the tool change arm 14 is driven by the first servo motor 12 to rotate counterclockwise as shown in (9a) to (9c) of FIG. 9, before the tool change arm 14 rotates toward the tool 100 on the spindle 21, the second servo drive 33 starts the second servo motor 25 to drive the tool unclamp unit 20, and then the spindle 21 of the tool unclamp unit 20 unclamps the tool 100 as illustrated in 8(c) of FIG. 8, wherein when the rotating cycle time of the motor is at 41 degrees, the tool 100 on the spindle 21 is unclamped and removed, and when the tool change arm 14 rotates toward the tool 100 on the spindle 21 and the tool unclamp unit 20 removes the tool 100, the tool change arm 14 locks the tool 100 (as shown in FIG. 2, and the rotating cycle time is at 60.5 degrees). Referring further to (8b) of FIG. 8 and (9c) of FIG. 9, the cam box 11 drives the tool change arm 14 to move 114 mm downwardly (the rotating cycle time is at 83 degrees) toward a downward starting point (as illustrated in (9d) of FIG. 9; and the rotating cycle time is at 139 degrees), then as shown in (9d) of FIG. 9 and (8a) of FIG. 8, the tool change arm 14 further rotates 180 degrees counterclockwise and upwardly moves 114 mm to return back to an upward starting point (as illustrated in FIG. 9e); and the rotating cycle time is at 277 degrees), thus finishing tool unclamping operation. After the tool change arm 14 releases the tool 100 (a distance of unclamping the tool 100 is 12 mm) and rotates 65 degrees (as shown in (9f) of FIG. 9) clockwise, the tool 100 is clamped and unclamped by the tool change arm 14 and the spindle 21 synchronously.

Figure 10:
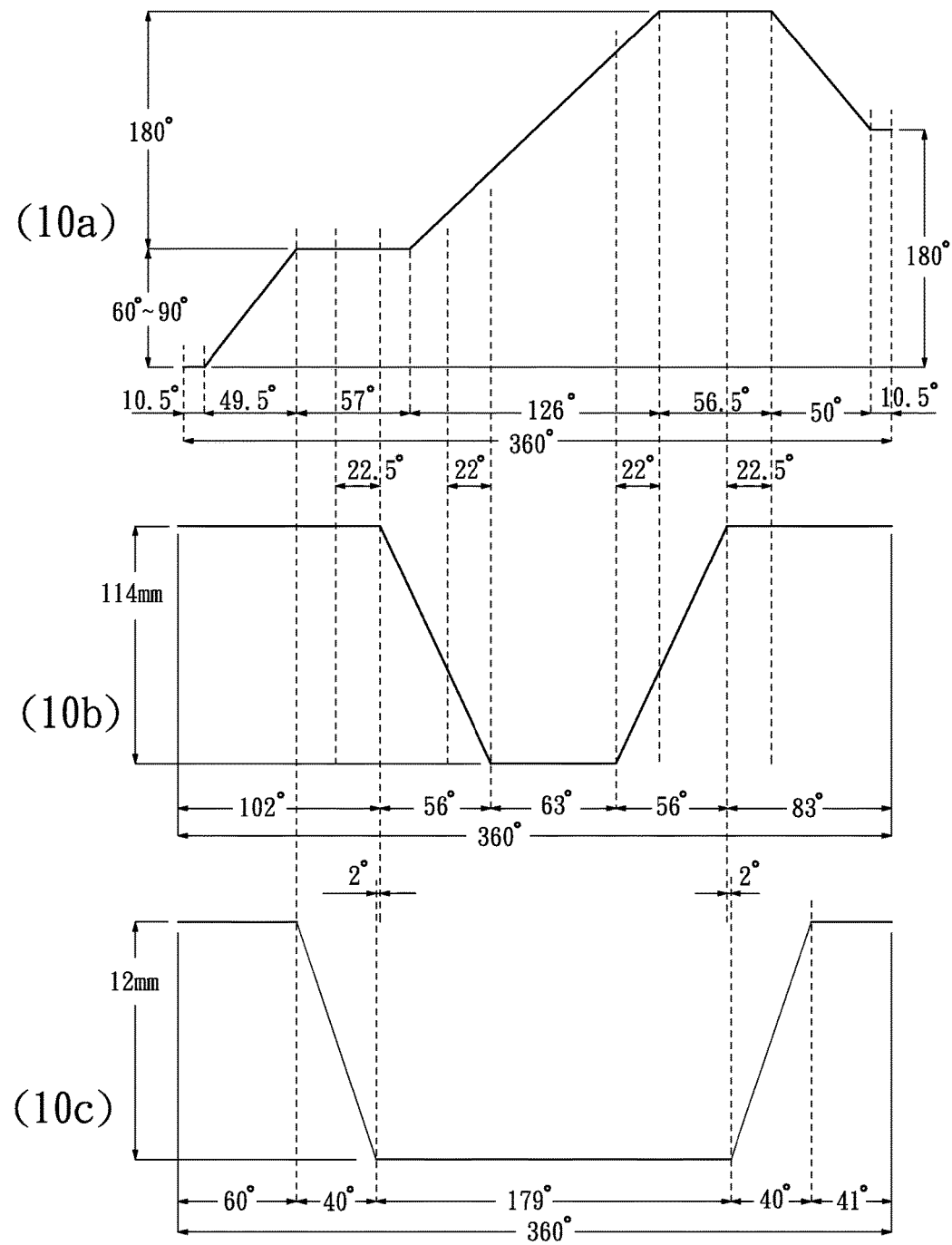
FIG. 10 is a sequence diagram showing after the tool change arm clamps the tool, the spindle unclamps the tool, wherein part (10*a*) is a curve diagram illustrating the rotating operation of the tool change arm, part (10*b*) is a curve diagram illustrating the vertical moving operation of the driving shaft of the tool change arm, and part (10*c*) is a curve diagram illustrating the tool unclamping and clamping operations of the tool unclamp unit.

With reference to FIG. 10, an angle at a horizontal coordinate represents an angle of a rotating cycle time of the motor, and a vertical coordinate denotes a rotating angle 10a, a vertical moving distance 10b, and an unclamping distance 10c of the tool change arm 14.

A synchronous tool unclamping of the servo-driven tool unclamping system in a second operation mode means the spindle 21 releases the tool, after the tool change arm 14 re-clamps the tool. For instance, as shown in FIGS. 1, 2, 9 and 10, the main controller 31 of the servo control unit 30 controls the first servo drive 32 to start the first servo motor 12, and then the tool change arm 14 is driven by the first servo motor 12 to rotate counterclockwise as shown in (9a) to (9b) of FIG. 9, wherein when the tool change arm 14 rotates toward the tool 100 on the spindle 21 and clamps the tool 100 (as illustrated in FIG. 2), the second servo drive 33 simultaneously starts the second servo motor 25 to drive the tool unclamp unit 20, and then the spindle 21 of the tool unclamp unit 20 unclamps and removes the tool 100 as illustrated in 10(c) of FIG. 10. After the tool 100 is removed (the rotating cycle time is at 100 degrees). Referring further to (10b) of FIG. 10 and (9c) of FIG. 9, the cam box 11 drives the tool change arm 14 to move 114 mm downwardly (the rotating cycle time is at 102 degrees) toward the downward starting point (as illustrated in (9d) of FIG. 9; and the rotating cycle time is at 158 degrees), then as shown in (9d) of FIG. 9 and (10a) of FIG. 10, the tool change arm 14 further rotates 180 degrees counterclockwise and upwardly moves 114 mm to return back to the upward starting point (as illustrated in FIG. (9e); and the rotating cycle time is at 277 degrees), thus finishing the tool unclamping operation. After the tool change arm 14 releases the tool 100 (the distance of unclamping the tool 100 is 12 mm) and rotates 65 degrees (as shown in (9f) of FIG. 9) clockwise, the tool 100 is clamped and released by the tool change arm 14 and the spindle 21 synchronously.

As illustrated in (8b) and (8c) of FIG. 8, (10b) and (10c) of FIG. 10, and (9e) and (9e) of FIG. 9, before the tool change arm 14 moves 114 mm downwardly and after the tool change arm 14 moves 114 mm upwardly, 2 degrees of tool unclamping distances (i.e., a time difference, the rotating cycle time) occur. For example, before moving upwardly, the tool change arm 14 locks the tool 100 on the spindle 21, and after moving downwardly, the tool change arm 14 releases the tool 100 to prevent the tool hitting the machine tool.

As shown in FIG. 9, when the tool change arm 14 clamps and unclamps the tool, its rotating angle is 64 degrees. Preferably, the rotating angle of the tool change arm 14 is set within 60 to 90 degrees.

Accordingly, the servo-driven tool unclamping system of the present invention has following advantages:

1. Due to the tool changing unit 10 and the tool unclamp unit 20 are controlled by the first servo drive 32 and the second servo drive 33, both of which are controlled by the main controller 31, the tool change arm 14 and the spindle 21 are numerically controlled to clamp and unclamp the tool synchronously.

2. When the tool change arm 14 operates and the spindle 21 clamps and unclamps the tool, the spindle 21 unclamps the tool firstly and then the tool change arm 14 clamps the tool or the tool change arm 14 clamps the tool firstly and then the spindle 21 unclamps the tool based on a changeable operating sequence, hence the tool change arm 14 and the spindle 21 clamp and unclamp the tool synchronously.

3. The sensor detects a position of the tool change arm in a conventional tool changing operation, so several pauses occur to prolong working time. However, the tool change arm 14 and the spindle 21 of the present invention are numerically controlled to clamp and unclamp the tool synchronously and successively by using the program, thus accelerating working time and enhancing production efficiency.

4. The second servo motor 25 directly drives the transmission assembly 23 so that the biasing member 231 of the transmission assembly 23 actuates the pushing stem 241, and then the pushing stem 241 moves linearly between the pulling position and the unclamping position, the tool unclamp unit 20 clamps and unclamps the tool 100 on the spindle 21 quickly. Thereby, the servo-driven tool unclamping system is simplified, has a small size, and operates precisely and quickly.

5. The biasing member 231 is removed from the transmission assembly 23, for instance, the protective cover (not shown) of the casing 22 is opened, and the plural screwing elements 234 are unscrewed, the biasing member 231 of various operating tracks is therefore replaced to change a tool unclamping travel of the pushing stem 241. Accordingly, the tool unclamp unit 20 is capable of adjusting the tool unclamping travel of the driving assembly 24 and is applicable for tool unlock mechanisms of various brands.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A servo-driven tool unclamping system of a machine tool being employed to operate two tools and comprising:
   a tool changing unit including a cam box, a first servo motor for driving the cam box, a driving shaft driven by the cam box, and a tool change arm driven by the driving shaft to rotate, the first servo motor driving the cam box and the driving shaft sequentially to control the tool change arm to change the two tools;
   a tool unclamp unit including a spindle, a transmission assembly, and a second servo motor, the second servo motor driving the transmission assembly to actuate the spindle to unclamp and clamp each of the two tools;
   a servo control unit including a main controller, a first servo drive and a second servo drive both electrically connected with and controlled by the main controller, wherein the first servo drive is electrically coupled with the first servo motor and numerically controls the tool changing unit by using a program, and the second servo drive is electrically coupled with the second servo motor and numerically controls the tool unclamp unit by using the program, such that operation of the tool change arm occurs synchronously with tool clamping/unclamping at the spindle and the spindle clamps and unclamps said each tool synchronously;
   wherein the first servo motor has a drive shaft; the tool unclamp unit also includes a casing for accommodating the transmission assembly and a driving assembly, and the transmission assembly includes a gear set coupling with a drive shaft of the second servo motor and a biasing member synchronously operating with the gear set, wherein the biasing member has a noncircular face defined around a peripheral side thereof; the driving assembly is secured on the spindle and includes a pushing stem sliding along the spindle and a resilient element fitted on the pushing stem, the pushing stem has a top edge corresponding to the noncircular face of the biasing member and a bottom edge corresponding to a pull stud of the spindle, and the resilient element is biased against the biasing member.

2. The servo-driven tool unclamping system of the machine tool as claimed in claim 1, wherein the gear set has a first gear rotatably disposed in the casing and a second gear meshing with the first gear and pivoted on the drive shaft of the second servo motor to form a gear deceleration system, wherein the biasing member is in connection with the first gear.

3. The servo-driven tool unclamping system of the machine tool as claimed in claim 1, wherein the biasing member of the transmission assembly has a concaved section arranged on the noncircular face and a convex section proximate to one side of the concaved section.

4. The servo-driven tool unclamping system of the machine tool as claimed in claim 1, wherein the driving assembly further includes an abutting holder mounted on the bottom edge of the pushing stem to abut against the pull stud.

5. The servo-driven tool unclamping system of the machine tool as claimed in claim 1, wherein the pushing stem of the driving assembly further includes a rolling element rotatably fixed on the top edge thereof, and the pushing stem linearly contacts with the biasing member by means of the rolling element.

6. The servo-driven tool unclamping system of the machine tool as claimed in claim 1, wherein the driving assembly further includes a receiving tube fixed on a bottom end of the casing and a lid disposed on a bottom end of the receiving tube, wherein the pushing stem and the resilient element are mounted in the receiving tube.

* * * * *